(No Model.)

R. B. TATE.
LINE HITCH.

No. 583,608.

Patented June 1, 1897.

WITNESSES:
R. Durfee.
C. M. Wilbur.

INVENTOR:
Robert B. Tate,
By O. M. Shaw,
ATTYS.

THE NORRIS PETERS CO., PHOTO-LITHO., WASHINGTON, D. C.

UNITED STATES PATENT OFFICE.

ROBERT B. TATE, OF MALDEN, MASSACHUSETTS.

LINE-HITCH.

SPECIFICATION forming part of Letters Patent No. 583,608, dated June 1, 1897.

Application filed August 14, 1896. Serial No. 602,721. (No model.)

*To all whom it may concern:*

Be it known that I, ROBERT B. TATE, of Malden, in the county of Middlesex, State of Massachusetts, have invented certain new and useful Improvements in Line-Hitches, of which the following is a description sufficiently full, clear, and exact to enable any person skilled in the art or science to which said invention appertains to make and use the same, reference being had to the accompanying drawings, forming part of this specification, in which—

Figure 1:
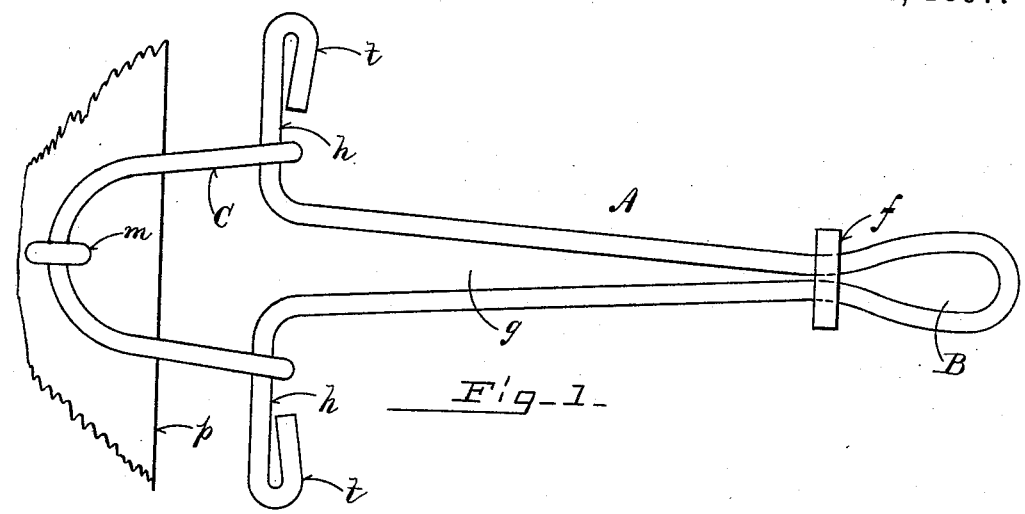
Figure 2:
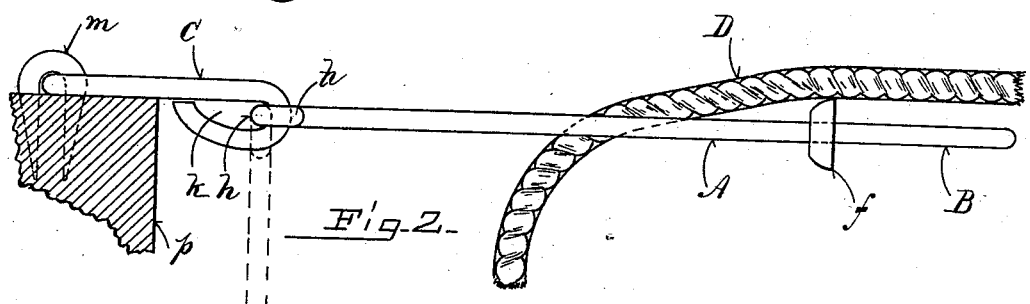

Figure 1 is a plan view of my improved line-hitch; Fig. 2, a side elevation of the same represented in use, and Fig. 3 a perspective view illustrating a modification.

Like letters of reference indicate corresponding parts in the different figures of the drawings.

My invention relates especially to a device for securing clothes-lines, halters, or other lines to a support; and it consists in certain novel features hereinafter fully set forth and claimed, the object being to produce a simple, cheap, and effective device of this character.

The nature and operation of the improvement will be readily understood by all conversant with such matters from the following explanation:

In the drawings, A represents the hitch considered as a whole. This comprises a rod of spring-wire bent or folded upon itself to form a loop B. The arms of the wire at the end of this loop are connected by a link $f$. Said arms then spread into a V shape $g$ and their ends $h$ are bent outwardly at right angles. These ends pass through loops $k$ in the ends of a U-wire C, which is pivoted in an eye $m$ on a post $p$ or other suitable support. In use the line D is inserted between the arms of the hitch outside the line $f$ and drawn solidly into the notch, the spring of the metal permitting the same to be clamped securely thereby. The arms at their outer ends are provided with heads $t$ to prevent their being accidentally withdrawn from the eyes $k$ of the U-wire.

Figure 3:
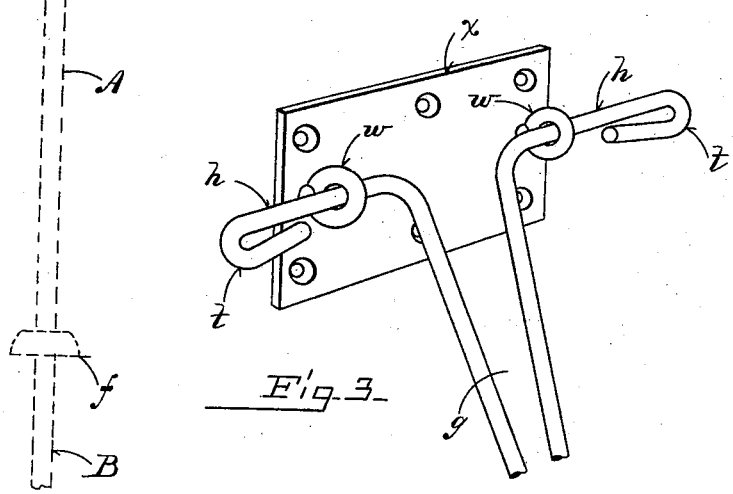

In Fig. 3 the arms $h$ of the hitch or clamp are passed through eyes $w$, secured in an attaching-plate $x$. The hitch being thus pivoted to the support, it is permitted to readily follow the movements of the line and prevents said line from becoming accidentally disengaged from the hitch.

I form the loop B in the hitch to overcome the danger of the V splitting, as might possibly occur were the wire bent at a sharp angle upon itself. The link prevents the line from being drawn into said loop.

Having thus explained my invention, what I claim is—

1. The hitch, A, bent to form the loop, B, V-spring, $g$, and laterally-projecting arms, $h$, in combination with the encircling link, $f$.

2. The hitch, A, bent to form the loop, B, V-spring, $g$, and laterally-projecting arms, $h$, in combination with the encircling link, $f$, and U-wire, C, in which said arms are pivoted.

ROBERT B. TATE.

Witnesses:
O. M. SHAW,
K. DURFEE.